United States Patent [19]
Wulff

[11] Patent Number: 4,967,505
[45] Date of Patent: Nov. 6, 1990

[54] ELONGATED FISHING FLY

[76] Inventor: Lee Wulff, Beaverkill Rd., Lew Beach, N.Y. 12753

[21] Appl. No.: 402,611

[22] Filed: Sep. 5, 1989

Related U.S. Application Data

[63] Continuation of Ser. No. 230,882, Aug. 11, 1988.

[51] Int. Cl.⁵ .............................................. A01K 85/00
[52] U.S. Cl. .................................. 43/42.05; 43/42.28; 43/42.15; 43/42.25
[58] Field of Search ................ 43/42.24, 42.25, 42.26, 43/42.28, 42.36, 42.15, 42.17, 42.05

[56] References Cited

U.S. PATENT DOCUMENTS

| | | | |
|---|---|---|---|
| 1,754,567 | 4/1930 | Newell | 43/42.05 |
| 2,328,295 | 8/1943 | Provost | 43/42.28 |
| 2,532,961 | 12/1950 | Steen | 43/42.15 |
| 2,575,248 | 11/1951 | Clark | 43/42.25 |
| 2,612,717 | 10/1952 | Kuehnel | 43/42.15 |
| 2,625,767 | 1/1953 | Pokras | 43/42.05 |
| 2,912,783 | 11/1959 | Marks | 43/42.05 |
| 4,138,791 | 2/1979 | Anson | 43/42.15 |

Primary Examiner—Kurt Rowan
Attorney, Agent, or Firm—Charles R. Fay

[57] ABSTRACT

A fishing fly that includes a length of wire or leader to an end of which there is swively connected a fish hook so the hook easily swivels relative to the wire, and fly dressing on the wire or leader extending to the hook or into the hook area to partially cover the hook. Further fly dressing can be applied to the hook.

12 Claims, 1 Drawing Sheet

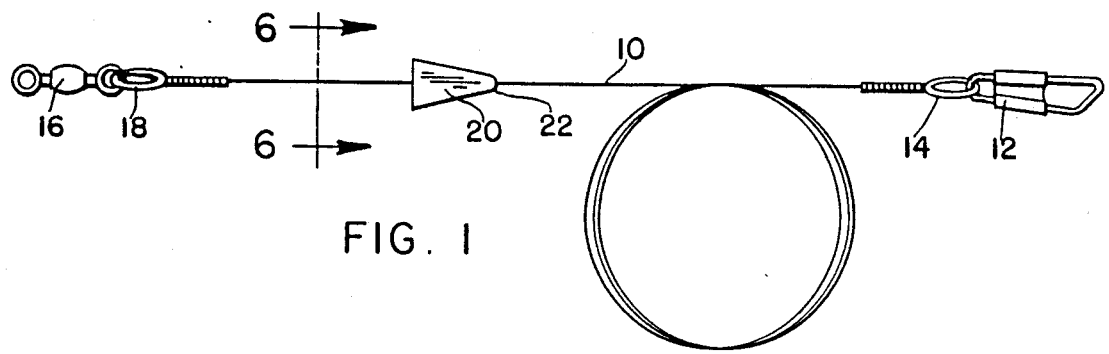
FIG. 1
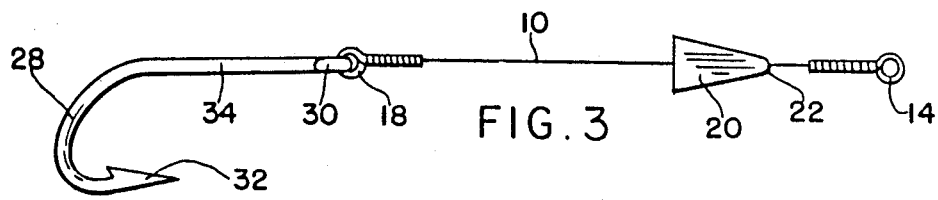
FIG. 3
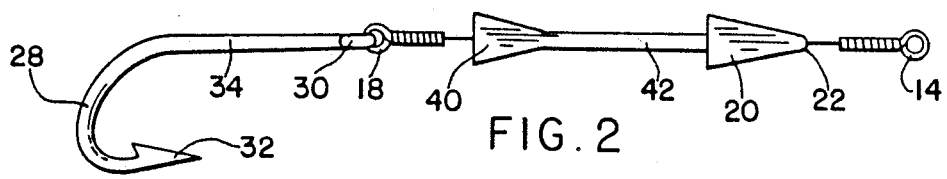
FIG. 2
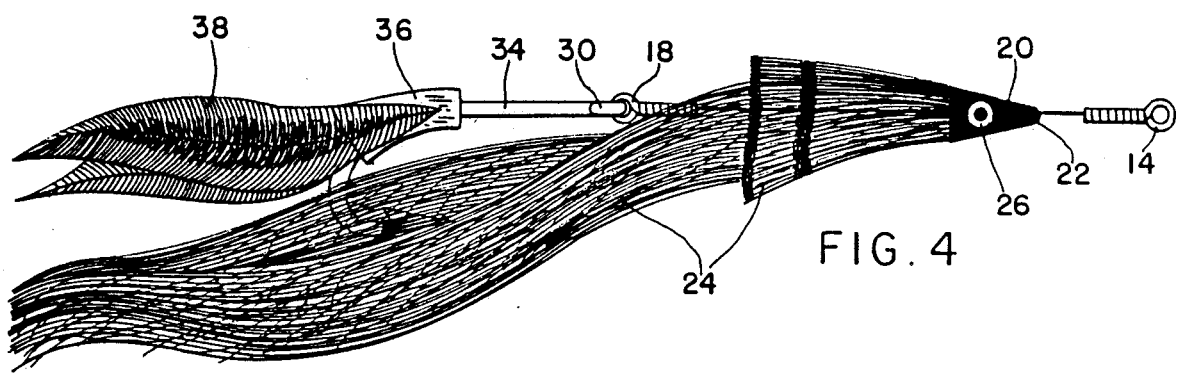
FIG. 4
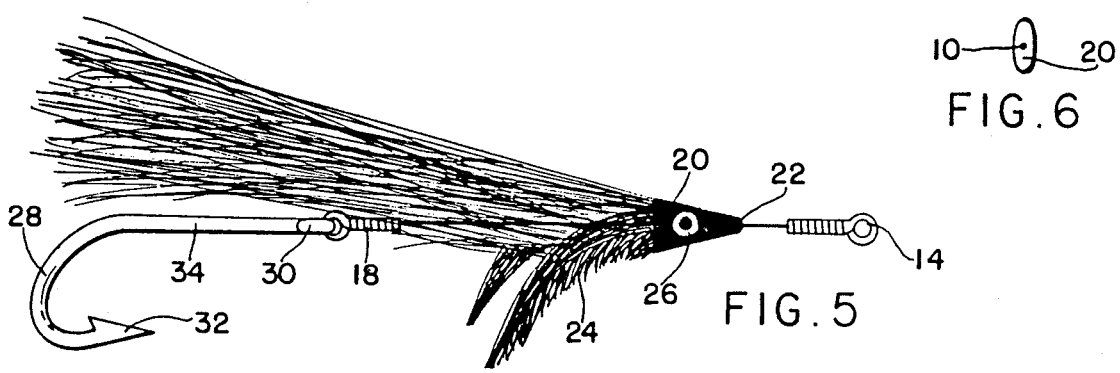
FIG. 6
FIG. 5

ELONGATED FISHING FLY

This is a continuation of U.S. Pt. No. 230,882, now abandoned.

FIELD OF THE INVENTION

Elongated, dressed flies, such as are often used for fly casting and trolling, especially for big fish.

BACKGROUND OF THE INVENTION

It is often desired to use large, elongated fishing flies dressed e.g., to imitate bait fish especially for trolling for big fish. While this large type of fly is usually used for large, sharp toothed salt water fish, e.g., barracuda, marlin, sailfish, tarpon, etc., they may also be used in fresh water for pike and muskies, pickerel and even large trout and salmon. Such elongated flies are usually made in a single hook type wherein the shank of the hook is long, and it has been noted that long shank hooks have great leverage taken by a large fish and when pulled upon by the angler. Long shank flies thus have a powerful action with a strong fish to twist and tear the flesh or enlarge the hook hold on the fish, thus loosening the hook and losing the fish.

This invention makes it possible to provide longer flies than can be made on single long shank hooks, and this is a great advantage to the fisherman, resulting in less loss of hooked fish, and it also avoids the necessity of an extra wire trace to prevent sharp-toothed fish from severing the line or leader.

SUMMARY OF THE INVENTION

A plastic fly body or head is molded directly onto a wire section or length of leader material, at a selected point spaced from an end of the wire or leader. A conventional fly or bare hook is swively connected to the fly body, wire, or leader. Thus the point of the hook is farther back, to a desired degree, than is possible with a long shank fly with the improvement that the hook per se swivels relative to the wire or leader as the fish fights to release itself, and the undesired leverage of the long shank hook is avoided. The fly body or head is plastic injection molded onto the wire or other leader material, and thus bonded thereto in fixed position as desired to select the length of the fly. A safety trace to prevent a fish from severing the leader or line is obviated as wire on which the plastic fly body is fixed takes the place of any extra trace. A rotary snap at the end of the wire is easily attached to secure the hook and the forward end of the wire can be attached directly to leader or line.

The plastic fly body may be single and form a head for the fly or it can be multiple, to secure more dressing, or multiple heads can be connected by plastic material to form a complete body fixed to the wire. The invention may be used with a standard fly, bare hook, or hook dressed in conformance with the fly dressing used, and the length of the wire on which the plastic head or body is molded, as well as the length of the head or body, may be chosen to accommodate the size of fly wanted, the amount of fly making material desired, and the length of wire or leader material desired ahead of the fly.

BRIEF DESCRIPTION OF THE DRAWINGS

FIG. 1 is an elevational view of one form of the invention;

FIG. 2 is a like view of another form of the invention;

FIG. 3 is a view of the invention including a hook, but no dressing,

FIG. 4 is a view like FIG. 3 but showing fly dressing on the wire and also on the hook;

FIG. 5 is a similar view illustrating fly dressing on the wire but a bare hook, and FIG. 6 is an enlarged section on line 6—6 of FIG. 1.

PREFERRED EMBODIMENT OF THE DISCLOSURE

FIG. 1 shows a trace or wire leader or snell 10 which may be of any length depending on the angler's wish or type of fish that is apt to be caught. It may have a conventional swivel snap 12 connected to the leading or forward end of wire 10 as by a loop 14; and there is a hook connector 16 at the opposite, trailing or rearward, terminal end 18, the connector 16 being any conventional swivel joint or the like or a mere loop in the wire as shown herein terminating the wire 10. A plastic head or body 20 is molded in fixed position as by injection molding in a suitable die onto the wire 10 in a selected position thereon at a desired distance from the terminal or hook connector 18. This plastic head or body is preferable generally triangular in outline having a point or corner of the triangle pointing forwardly as at 22. This triangle is thick enough to encompass completely the wire 10 but it can be only so thick, as for this purpose, or it can be thicker. In this shape, it serves as the base or mount for the fly dressing, generally indicated at 24 in FIG. 4 and can be painted or otherwise embellished to portray the eye 26 of a bait, fish or the like. The separate, conventional hook 28 has an eye 30, hook point 32, and shank 34.

As shown in FIG. 4, another plastic base 36 can be applied to the hook shank 34 for dressing 38, but this is not necessary as the hook may be used completely bare with the dressing 24 covering the hook or partly covering the hook. The essential construction is the swivel action of the hook relative to the wire trace, leader, or snell 10, to carry out the great difference in action, when fighting a large fish, over the conventional long shank (streamer) hook, to lessen the leverage by which the fish may escape.

The showing in FIG. 3 is the same as FIG. 1, except for the length of wire 10. FIG. 2 shows a sort of multiple plastic head or body construction using the molded plastic member 20 as before, but adding a downstream like member 40 forming a base for more or different dressing more directly covering the hook than dressing 24. In this case, a single molded member including the heads or bodies 20 and 40, and a smaller connector 42 applied simultaneously, can be utilized. More than two heads 20 and 40 can be used, as well as the body 36, FIG. 4, for fuller dressing.

I claim:

1. An artificial fishing fly for use in fly casting comprising
 a leader having a leading end for connection to a fly casting line and a trailing end for connection to a hook,
 a plastic head molded in fixed position on said leader forward of said trailing end,
 a hook,
 means for securing the hook to the trailing end of said leader, said hook being secured to the trailing end of said leader by said securing means,
 and fly dressing material attached to said plastic head, said fly dressing material extending from said plastic head into the area of said hook for at least partially covering said hook.

2. The artificial fishing fly of claim 1 wherein said means for securing the hook to the trailing end of said leader includes a swivel.

3. The artificial fishing fly of claim 1 wherein said leader is a snell.

4. The artificial fishing fly of claim 1 wherein said plastic head is injection molded onto said leader.

5. The artificial fishing fly of claim 1 wherein said plastic head is generally triangular in outline, said head having an apex of its triangular outline located on the leader with the remainder of the triangular head extending rearwardly of the apex toward said trailing end.

6. An artificial fishing fly for use in fly casting comprising
    a leader having a leading end for connection to a fly casting line and a trailing end for connection to a hook,
    a first plastic head molded in fixed position on said leader spaced from and forward of said trailing end,
    a second plastic head molded in fixed position on said leader between said first plastic head and said trailing end,
    a hook,
    means for securing the hook to the trailing end of said leader, said hook being secured to the trailing end of said leader by said securing means,
    and fly dressing materials attached to each of said first and second plastic heads and extending rearwardly from said plastic heads toward said trailing ends, the fly dressing material from at least one of said plastic heads extending into the area of said hook for at least partially covering said hook.

7. The artificial fly of claim 6 together with an intermediate plastic connecting member molded onto said leader between said first and second plastic heads, said intermediate plastic connecting member being integrally connected to said first and second plastic heads.

8. The artificial fly of claim 6 wherein each of said first and second plastic heads is generally triangular in outline, each of said heads having an apex of its triangular outline located on the leader with the remainder of the triangular head extending rearwardly from the apex toward said trailing end.

9. The artificial fly of claim 6 wherein said means for securing the hook to the trailing end of said leader includes a swivel.

10. The artificial fly of claim 6 wherein said leader is a snell.

11. The artificial fly of claim 6 wherein said first and second plastic heads are injection molded onto said leader.

12. The artificial fly of claim 6 wherein said first and second plastic heads and said intermediate plastic connecting member are injection molded simultaneously onto said leader.

* * * * *